(12) United States Patent
Havercan

(10) Patent No.: US 9,894,046 B2
(45) Date of Patent: *Feb. 13, 2018

(54) HANDLING EXPIRED PASSWORDS

(71) Applicant: INTERNATIONAL BUSINESS MACHINES CORPORATION, Armonk, NY (US)

(72) Inventor: Peter E. Havercan, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/478,983

(22) Filed: Apr. 4, 2017

(65) Prior Publication Data

US 2017/0208051 A1    Jul. 20, 2017

Related U.S. Application Data

(63) Continuation of application No. 12/935,802, filed as application No. PCT/EP2009/053870 on Apr. 1, 2009.

(30) Foreign Application Priority Data

Apr. 8, 2008 (EP) .................................... 08154050

(51) Int. Cl.
  *G06F 21/00* (2013.01)
  *H04L 29/06* (2006.01)
  (Continued)

(52) U.S. Cl.
  CPC ............ *H04L 63/068* (2013.01); *G06F 21/31* (2013.01); *H04L 9/088* (2013.01);
  (Continued)

(58) Field of Classification Search
  CPC ......... H04L 9/08; H04L 9/0861; H04L 9/088; H04L 9/3226; H04L 9/3228;
  (Continued)

(56) References Cited

U.S. PATENT DOCUMENTS

| | | |
|---|---|---|
| 5,606,663 A | 2/1997 | Kadooka |
| 5,944,825 A | 8/1999 | Bellemore et al. |

(Continued)

FOREIGN PATENT DOCUMENTS

| | | |
|---|---|---|
| JP | 11-134298 A | 5/1999 |
| JP | 11-328051 A | 11/1999 |

(Continued)

OTHER PUBLICATIONS

Menezes et al., Chapter 12 "Key Establishment Protocols" from the Handbook of Applied Cryptography, CRC Press, 1996, www.cacr.math.uwaterloo.ca/hac.

(Continued)

*Primary Examiner* — Daniel Potratz
(74) *Attorney, Agent, or Firm* — Steven L. Nichols; Fabian VanCott

(57) ABSTRACT

A method of operating a server comprises receiving an authorization request comprising a password, accessing an expiry date for the password, transmitting a response comprising the expiry date, ascertaining whether the password has expired, and receiving a new password, if the password has expired. Optionally, the transmitted response further comprises a date representing the last use of the password and/or an integer value representing a retry parameter.

18 Claims, 4 Drawing Sheets

(51) Int. Cl.
*H04L 9/08* (2006.01)
*G06F 21/31* (2013.01)
*G06F 21/46* (2013.01)

(52) U.S. Cl.
CPC .......... *H04L 63/0846* (2013.01); *G06F 21/46* (2013.01); *G06F 2221/2137* (2013.01)

(58) Field of Classification Search
CPC ... H04L 63/083; H04L 63/067; H04L 63/068; H04L 63/0846
See application file for complete search history.

(56) References Cited

U.S. PATENT DOCUMENTS

| | | | |
|---|---|---|---|
| 7,200,754 B2 | 4/2007 | Walters | |
| 7,225,331 B1 | 5/2007 | McBrearty et al. | |
| 7,373,516 B2 | 5/2008 | Ashok | |
| 2004/0177272 A1* | 9/2004 | Walters | G06F 21/46 713/183 |
| 2005/0006461 A1* | 1/2005 | Shenker | G06Q 20/209 235/380 |
| 2006/0041756 A1* | 2/2006 | Ashok | G06F 21/31 713/183 |
| 2006/0136738 A1 | 6/2006 | Bauchot et al. | |
| 2007/0073633 A1 | 3/2007 | Gallant et al. | |
| 2007/0174901 A1 | 7/2007 | Chang et al. | |
| 2008/0066183 A1 | 3/2008 | George et al. | |
| 2008/0082832 A1 | 4/2008 | McDougal et al. | |
| 2008/0098093 A1 | 4/2008 | Simon et al. | |
| 2008/0114986 A1 | 5/2008 | Morris et al. | |
| 2008/0134239 A1* | 6/2008 | Knowles | H04N 5/44543 725/39 |

FOREIGN PATENT DOCUMENTS

| | | |
|---|---|---|
| JP | 2006-301931 A | 11/2006 |
| JP | 2006-527430 A | 11/2006 |
| JP | 2007-157044 A | 6/2007 |
| WO | 00/19297 A | 4/2000 |
| WO | 2007024170 A1 | 3/2007 |
| WO | WO 2007024170 A1 * | 3/2007 ............ H04L 29/06 |
| WO | 2009007188 A1 | 1/2009 |

OTHER PUBLICATIONS

Menezes et al., Chapter 13 "Key Management Techniques" from the Handbook of Applied Cryptography, CRC Press, 1996, www.cacr.math.uwaterloo.ca/hac.

* cited by examiner

HANDLING EXPIRED PASSWORDS

CROSS-REFERENCE TO RELATED APPLICATIONS

This application is a continuation of co-pending U.S. application Ser. No. 12/935,802, filed on Sep. 30, 2010, herein incorporated by reference in its entirety for all purposes. Pursuant to 35 U.S.C. §§ 119(a) and 365(b), the present application also claims priority from PCT Application No. EP2009/053870, filed on Apr. 1, 2009, and EP Application No. 08154050.2 filed on Apr. 4, 2008, the disclosure of which is incorporated herein by reference in its entirety.

TECHNICAL FIELD

This invention relates to a method of operating a server, the server itself, a computer program product and a computer program for operating the server. In particular, the invention relates to handling expired passwords in a method of operating a server, the server itself, a computer program product and a computer program for operating the server.

BACKGROUND OF THE INVENTION

It is common when electronically accessing a service, for authorisation to be required, to identify the party making the access. For example, many bank accounts can be accessed remotely via the Internet. In order for a user to access their bank account, they must supply a username and password, which are used to authorise the identity of the individual to the server that is providing the access to the bank account. The server stores the username (which need not be secure) and either the password or a digest of the password (in a secure manner), and checks the received password against the stored password or digest.

To make the process of authorisation more robust, it is common for passwords to have only a limited lifespan. Once a user chooses a password for the first time, in many systems, that password will only work for a predetermined length of time. This might be ninety days for example. During this period, the user can access the electronic service by using their username and password, but once the limited lifespan has passed, then the password can no longer be used to access the service. At this point, the password has said to have expired, in order for the user to continue to access the desired service, they need to provide a new password to replace the old password.

For example, U.S. Pat. No. 6,826,700 discloses a method and apparatus for a web application server to solicit automatically a new password when an existing password has expired. In this Patent, an apparatus for and method of utilizing an internet terminal coupled to the World Wide Web to access an existing proprietary data base management system having a dialog-based request format is disclosed. The internet terminal transfers a service request to the data base management system, having a password provided as required. When a service request is made having an expired password, the data base management system recognizes the problem. The internet terminal is queried for certain parameters, and the data base management system automatically reassigns a new and unexpired password.

Improvements in the known methods of handling passwords that have expired can be made. Systems such as those described in the Patent above are complicated and not compatible with some existing standards for network communication. Additionally, there is a need for a method of handling expired passwords that support greater flexibility on the client side of the network.

Therefore, there is a need in the art to solve the above aforementioned problems.

SUMMARY OF THE INVENTION

According to a first aspect of the present invention, there is provided a method of operating a server comprising receiving an authorisation request comprising a password, accessing an expiry date for the password, transmitting a response comprising the expiry date, ascertaining whether the password has expired, and receiving a new password, if the password has expired.

According to a second aspect of the present invention, there is provided a server arranged to receive an authorisation request comprising a password, access an expiry date for the password, transmit a response comprising the expiry date, ascertain whether the password has expired, and receive a new password, if the password has expired.

According to a third aspect of the present invention, there is provided a computer program product and a computer program on a computer readable medium for operating a server, the product comprising instructions for receiving an authorisation request comprising a password, accessing an expiry date for the password, transmitting a response comprising the expiry date, ascertaining whether the password has expired, and receiving a new password, if the password has expired.

A preferred embodiment of the invention provides an improved message request-reply transfer protocol which can handle expired and revoked passwords. A new header is used to indicate whether the server is taking part in the new protocol. From this the client device determines that it may send the new format of response header to the server, and can at the same time determine whether a password has expired or been revoked and can proactively send a new password upon expiry.

Owing to the invention, it is possible to provide a flexible system for handling passwords and their expiry in a message request-reply transfer protocol. Whenever a request is made to access a service where the request includes a password, then the server will reply with a response comprising password status information, such as the expiry date, which allows the client device to monitor the current status of the password, and handle the information as the client device sees fit including modifying the way in which client software prompts an end user for credentials. The response including the expiry date is sent from the server to the client device regardless of whether the password has actually expired or not, which allows the client device to take pre-emptive action, if desired. The response can include the expiry date in a header, within the scope of current standards such as Hypertext Transfer Protocol (HTTP).

Preferably, the transmitted response further comprises a date representing the last use of the password, and/or further comprises an integer value representing a retry parameter. The addition of further information within the response sent back to the client device further increases the range of options available to the client device in respect of handling the expiry (or imminent expiry) of a user password.

Advantageously, the process further comprises receiving a request comprising a new password, ascertaining that the new password is unacceptable, and transmitting a response including the integer value representing the retry parameter, the integer value being unchanged. The retry parameter can be used as a security measure, but if a new password is submitted that is held to be unacceptable for any reason (such as being too similar to the old password for example) then the retry parameter is not decremented.

Ideally, the process further comprises receiving a request comprising the old password, and transmitting a response including the integer value representing the retry parameter, the integer value being decremented by 1. Once a password has expired, then any re-submission of the old password leads to a refusal of the access request and a transmission of a decremented retry parameter. This warns the client device that the process of accessing the service at the server is in danger of being totally denied, when the retry parameter falls to zero.

BRIEF DESCRIPTION OF THE DRAWINGS

Embodiments of the present invention will now be described, by way of example only, with reference to the accompanying drawings, in which.

DETAILED DESCRIPTION OF THE INVENTION

Figure 1:
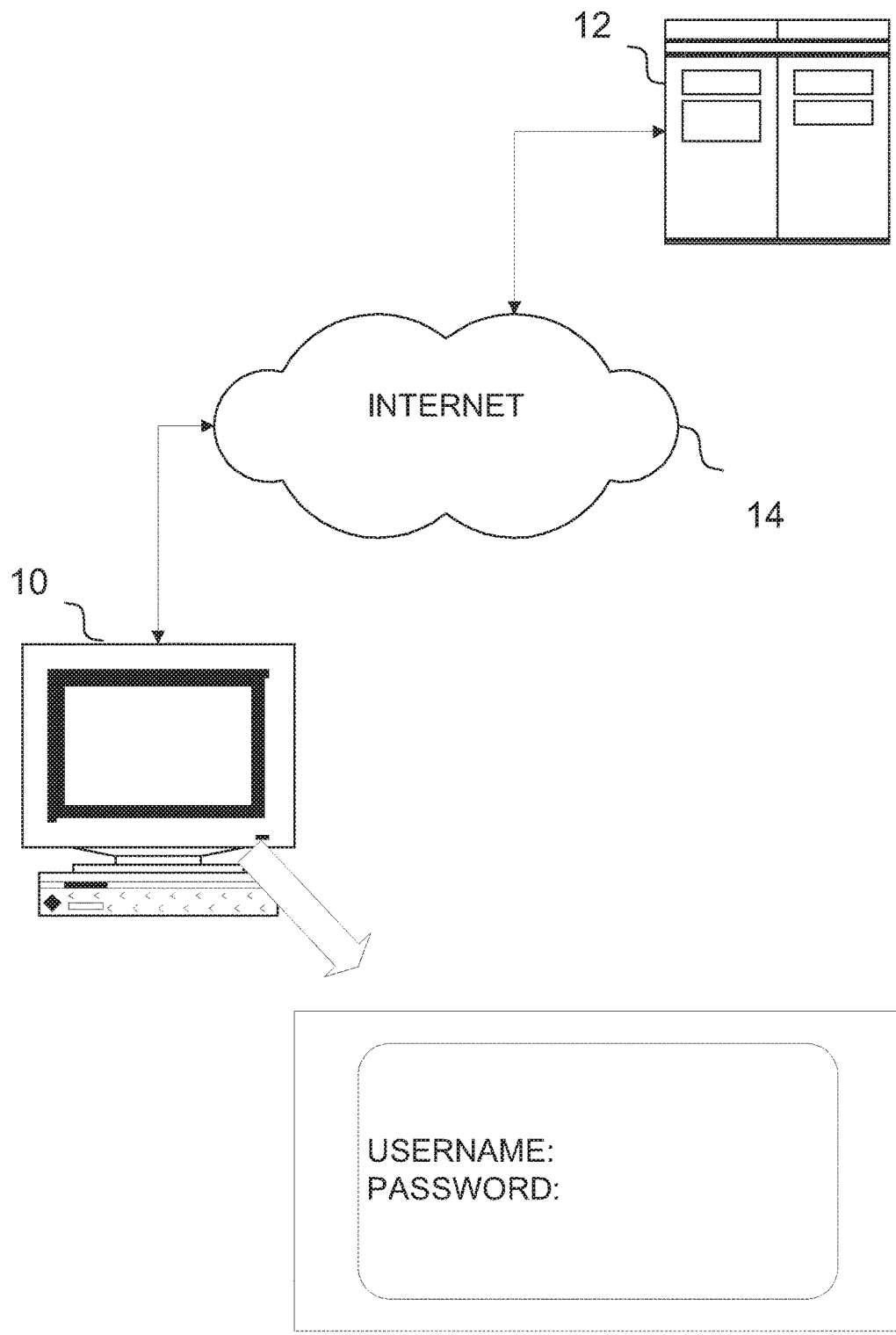
FIG. 1 is a schematic diagram of a system including a client device and a server.

FIG. 1 illustrates a system that comprises a client device 10 connected to a server 12 via a network 14. The client device has a display 16, shown in more detail in the Figure. A user will access a service hosted by the server 12 through their client device 10. As can be seen in the display 16, the user is required to be authorised to access the service, via the inputting of their username and password. The system illustrated in FIG. 1 shows the client device 10 as a personal computer, which could equally be a mobile device such as a mobile phone or suitably enabled personal digital assistant (pda). Likewise, the network 14, which is shown as a wide area network (the Internet), could be a local network such as a site-specific intranet. The server 12 stores the username of the user with either their password or some other data derived from their password (such as a digest of the password), which is used to authorise the user when they attempt to access the service provided by the server 12.

Communication between the client device 10 and the server 12; is handled by a predefined message request-reply transfer protocol, such as Hyper Text Transfer Protocol (HTTP). The HTTP protocol identifies two methods by which users can authenticate themselves to use a secure HTTP server, such as the server 12. These are the Basic Authentication and Digest Authentication schemes, as described in the document RFC2617 (see RFC2617, HTTP Authentication: Basic and Digest Access Authentication, Network Working Group, June 1999). In these schemes the HTTP client software (usually a Web browser) run by the client device 10 prompts the end user for their credentials (the username and password) and then encodes them before sending them to the server 12.

In both schemes the server 12 initiates an authentication challenge by responding with an HTTP 401 message containing a WWW-Authenticate header, which includes the name of a realm in which the credentials are valid. In the Digest Authentication scheme, the server 12 also sends a nonce value (an arbitrary binary value) to the client device 10, and the client device 10 must respond with a cryptographic checksum (digest) of the username, the password, the nonce value, the HTTP method, and the requested uniform resource locator (URL). In the Basic Authentication scheme a nonce is not used, and the client device 10 simply replies with the username and password, trivially encoded to prevent casual inspection of the password, but otherwise not cryptographically concealed.

Both of these schemes assume that there is a unique password for each username, and that once they are established, the client software run by the client device 10 can cache the credentials and present them over and over with each HTTP request to the server 12. The Digest Authentication scheme allows the nonce to become stale and to be refreshed without the need to prompt the user for new credentials.

However, in many other modern password-based security systems, including the IBM® z/OS® Security Server (RACF®) and some UNIX® implementations, the association between the username and the password is not permanent. (IBM and z/OS are trademarks of International Business Machines in the United States, or countries, or both. UNIX is a registered trademark of The Open Group, in the United States and other countries). In such systems, the password may become expired after a fixed number of days, and the end user must be prompted for a new password to continue accessing the server system 12. Furthermore, if the user fails to supply a valid password within a small number of attempts, the username becomes revoked, and any further attempts to use the username will fail, whether the correct password is entered or not.

Currently, neither the Basic Authentication scheme nor the Digest Authentication scheme (of HTTP) is able to cope with expired or revoked passwords. The system of FIG. 1 can be configured to provide an extension to these schemes that will support these password states. There is provided a mechanism by which the HTTP server 12 can return password status information to the client device 10. The client device 10 can then store the password status information along with the credentials that it is already saving. The password status information can be used to modify the way in which the client software run by the client device 10 prompts the end user for credentials, in particular to prompt for the replacement of an expired password.

If the HTTP server 12 wishes to inform the HTTP client 10 that the server 12 is able to manage expired and revoked passwords, then the server 12 should send a Password-Expiry header in response to an HTTP request containing credentials. The Password-Expiry header contains the following:

Password-Expiry: expiry-date [; retries=nn]

The optional retries=nn parameter indicates how many further incorrect password attempts will be permitted. The server 12 may also optionally send an informational header that describes the last successful use of the password:

Password-Last-Used: last-use-date

The datestamps expiry-date and last-use-date are in RFC1123 format (see RFC1123, Requirements for Internet Hosts-Application and Support, Network Working Group, October 1989 for date and time formatting). Examples of the two headers are:

Password-Expiry: Thu, 1 Mar. 2007 00:00:00 GMT; retries=5

Password-Last-Used: Fri, 16 Feb. 2007 17:45:20 GMT

If the server 12 sends a Password-Expiry header, this indicates that the server 12 is prepared to accept a new password in an extended Authorization header. The form of specification of the new password depends on whether the Authentication scheme is Basic or Digest. Detailed below are the forms that will be sent by the client device 10.

If the server 12 receives an extended Authorization with an unacceptable new password, it should respond with an HTTP 401 response containing a Password-Expiry header, but the retries value should remain unchanged. (If the old password is unacceptable, the retries value should be decremented by one.)

If the client device 10 receives a Password-Expiry header, the client device 10 should record the expiry-date and (if supplied) the retry count. If the retry count is zero, this indicates that the username is revoked, and the client must not make any further authorization attempts. If the expiry-date is today's date (or earlier), the client application run by the client device 10 must immediately prompt the end user for a new password, which it must then encode into one of the extended Authorization headers described below.

If the expiry-date is close, within a configurable number of days time, the client application run by the client device 10 may inform the end-user that the password is about to expire, and offer to accept and transmit a new password. If the end-user declines to provide a new password, authentication continues without the new password, using either Basic or Digest Authentication, as appropriate. But if the end-user does provide a new password, it should be encoded into one of the extended Authorization headers described below.

If the server 12 does not send a Password-Expiry header, the client device 10 must not send the extended Authorization header, as there is no indication that the server 12 is prepared to accept it. If the client device 10 receives a Password-Last-Used header, the client device 10 may display its contents to the end user, as a confirmation that the password had not been used since the last time an authorized user specified it, but this header does not participate in the authentication challenge or in the provision of the new password.

If the server 12 sends a HTTP 401 response to the password change in which the password expiry date and retry count remain unchanged, this indicates that the new password is unacceptable, so the end user should be prompted for a different new password. Once the client device 10 has received a HTTP 200 OK response from the server 12, after sending the server 12 a new password, then the old password should be discarded, and the successfully-validated new password should replace it in the cached credentials for the specified server. Subsequent requests to the same server 12 must send only the new password (until that password itself expires).

Figure 2:
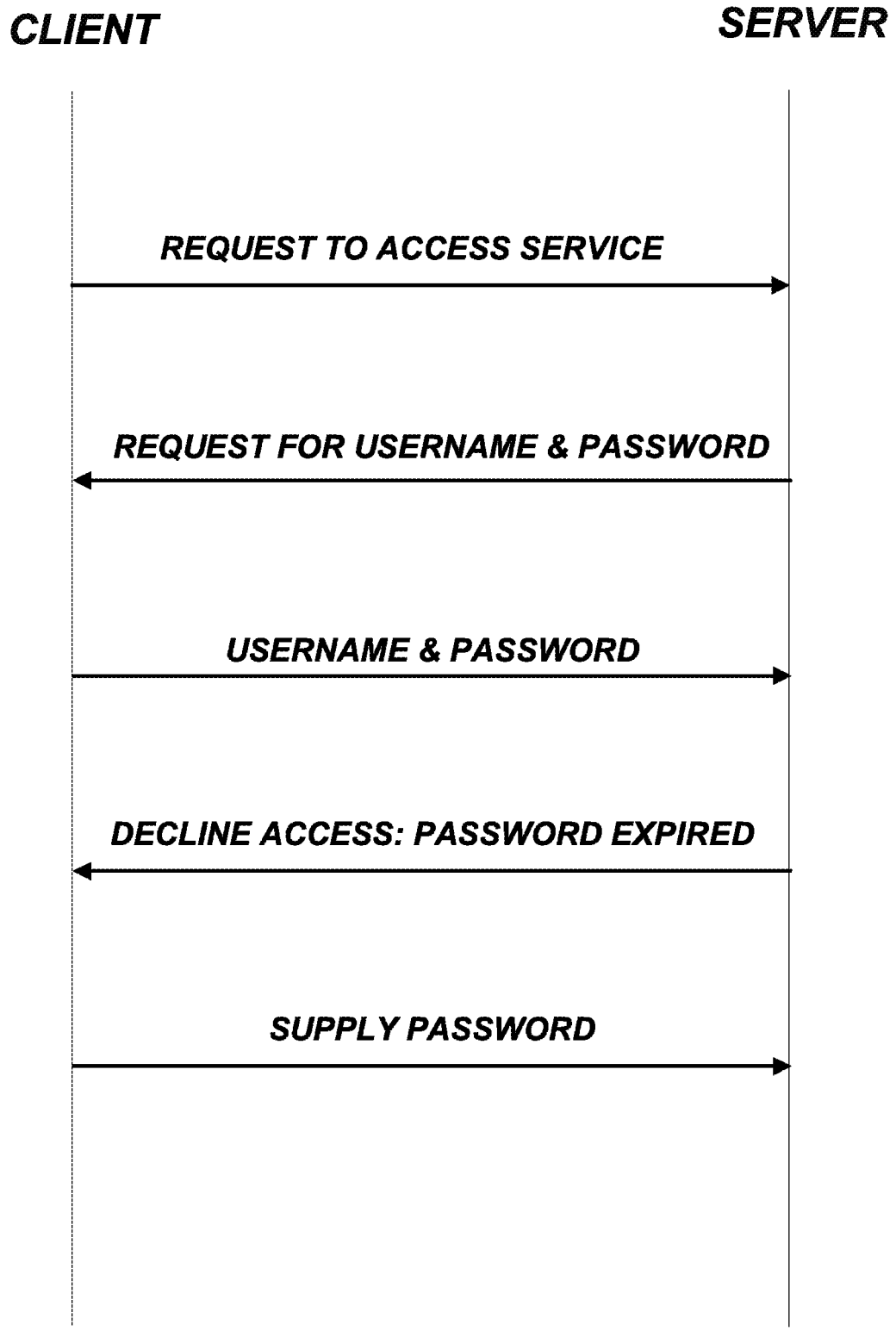
FIG. 2 is a diagram showing communication between the client device and the server.

FIG. 2 summarises the communication between the client device 10 and the server 12, in the situation when a user makes a request using a password. Firstly, the user, through the client device 10, will connect to the server 12 by making a request to access the service offered by the web server 12. The server 12 will then reply by requesting the authorisation details (username and password) of the user from the client device 10. The client device 10 replies with their username and current password. Whether the password has expired or not, then the server 12 will reply with a message which comprises a response including the header with the expiry date. If the password has already expired, then the user must supply a new password. Once the user has done this, then the new password is transmitted by the client device 10 to the server 12, which now authorises the user to access the desired service.

The specification of a new password in the Basic Authentication scheme of HTTP is carried out as follows. In the Basic scheme, the new password is encoded by including it in the basic-credentials of the Authorization header:

Authorization: Basic basic-credentials where, for the purposes of providing a new password, in the augmented BNF syntax defined in RFC822 (see RFC822, Standard for the format of ARPA Internet text messages Dept. of Electrical Engineering, University of Delaware, Newark, Del., Aug. 13, 1982 for the augmented Backus-Maur Form syntax):

basic-credentials=base64-user-pass
base64-user-pass=<base64 encoding of user-pass>
user-pass=username ":" password ":" newpassword
username=*<TEXT excluding ":">
password=*<TEXT excluding ":">
newpassword=*<TEXT>

In other words, just as the old expiring password is appended to the username after a colon, so the new password is appended to the old password after a second colon. The result is then encoded using base64 encoding.

In the specification of a new password in the Digest Authentication scheme, just as the old password is normally cryptographically concealed, so must the new password be. This cannot be achieved by digesting the new password, but it can be achieved by encrypting it, if a suitable encryption key can be devised. Since both the client device 10 and server 12 know the expiring password, this can be used to generate a shared secret that can be used as a key to encrypt the new password.

In this case, a suggested algorithm to generate the encrypted new password is:

Calculate a shared secret H(A1), as described in RFC2617, which is typically the MD5 hash of the string username:realm:password, to be used as an encryption key in the next step; Encrypt the new password using the AES encryption algorithm with the 128-bit key, and Encode the encrypted result using base64 encoding.

In an HTTP setting, the base64 encoded result can then be supplied as an additional newpassword keyword to the parameters normally sent in the HTTP Digest Authorization header, namely:

Authorization: credentials
credentials="Digest" digest-response
digest-response=1#(username|realm|nonce|digest-uri|response|
  [algorithm]|[cnonce]|[opaque]|
  [message-qop]|[nonce-count]|
  [new-password]|[auth-param])
username="username" "=" username-value
username-value=quoted-string
digest-uri="uri" "=" digest-uri-value
digest-uri-value=request-uri; As specified by HTTP/1.1
message-qop="qop" "=" qop-value
cnonce="cnonce" "=" cnonce-value
cnonce-value=nonce-value
nonce-count="nc" "=" nc-value
nc-value=8LHEX
response="response" "=" request-digest
request-digest=<">32LHEX <">
LHEX="0"|"1"|"2"|"3"|
  "4"|"5"|"6"|"7"|
  "8"|"9"|"a"|"b"|

"c"|"d"|"e"|"f"|
   new-password="newpassword" "=" base64-new-password
   base64-new-password=<base64 encoding of encrypted-new-password>
   encrypted-new-password=<AES encryption of new password
     using digest of old password>

Decryption of the new password n the Digest Authentication scheme of HTTP takes place. If the newpassword parameter is included in the Authorization header as described above, then the password should be decrypted by the reverse of the process used to encrypt it:

Generate the 20-byte SHA-1 digest of the old password
   Use the low-order 16 bytes of the resulting digest to obtain a 128-bit decryption key
   Decode the base64-encoded new password
   Decrypt the decoded new password using the AES decryption algorithm with the 128-bit key.

In this way, a new password can be created and transmitted in an encrypted fashion, in a simple and efficient manner. No encryption channels have to be opened between the client device 10 and server 12, and no greater storage or processing requirement is placed on either the client device 10 or the server 12.

Figure 3:
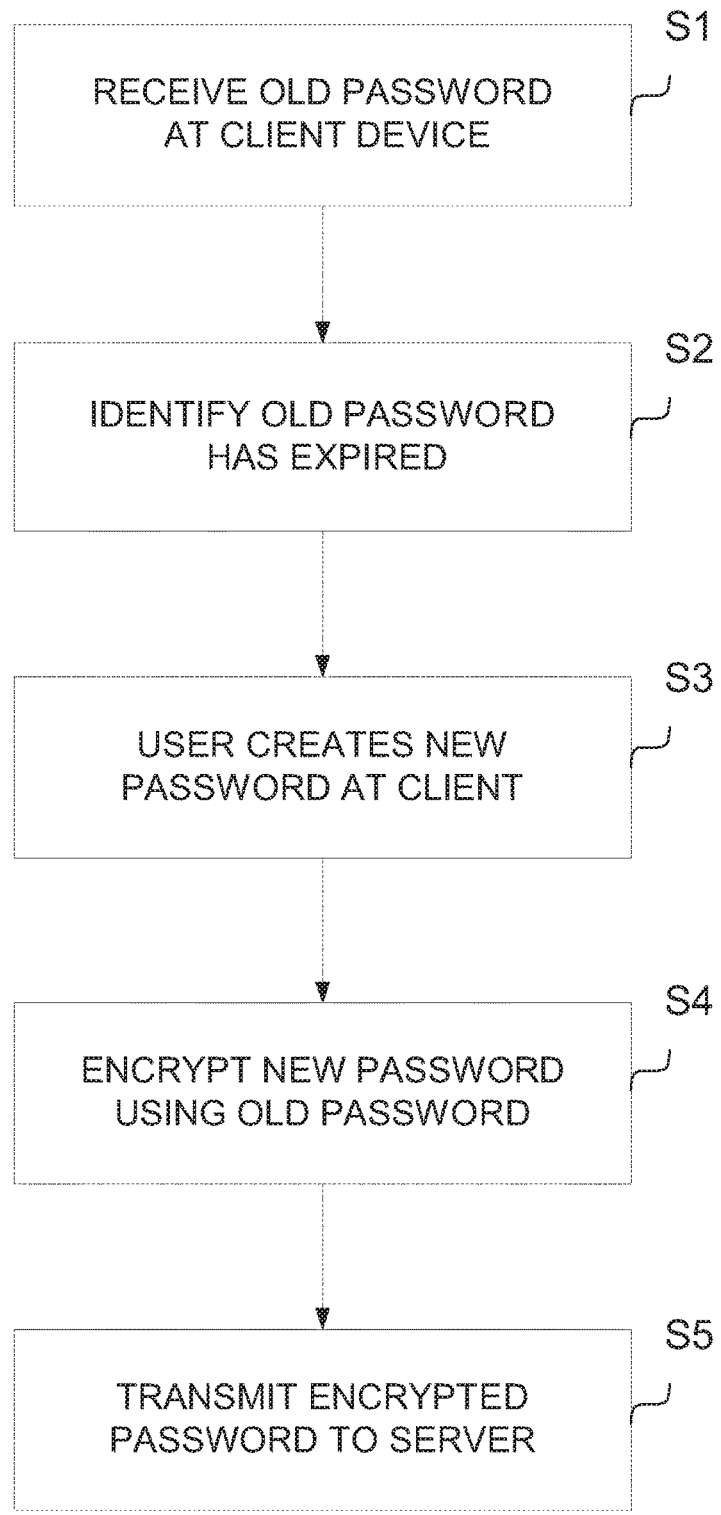
FIG. 3 is a flowchart of a method of operating the server.

FIG. 3 illustrates in more detail the process described above, in relation to the communication of a header including an expiry date from the server 12 to the client device 10. This process is carried out by the server 12. The method of operating the server 12 comprises, firstly, at step S1, receiving the authorisation request comprising a password from the client device 10. The server 12 then, at step S2, accesses an expiry date for the received password, and at step S3 transmits a response back to the client device 10, comprising the expiry date in a suitable form, such as a header within an HTTP message. The expiry date is returned to the client device 10 by the server 12, whether the password has expired or not.

This supports different configurations of the client device 10, allowing that device 10 to take action prior to the password expiring, if desired. The client device 10 may, for example, warn the user that their password is about to expire shortly.

The method of operating the server 12 also further comprises, at step S4, ascertaining whether the password has expired, and at step S5, receiving a new password, if the password has expired. The server 12, checks whether the password has expired, and if the password is no longer acceptable, then the server 12 will either trigger a new password procedure or accept a new password from the client device 10, both of which will include blocking the old password from providing authorisation. The new password creation procedure may be an active operation by the server 12, which will communicate with the client device 10 to obtain the new password, or will be a passive operation whereby the server 12 will assume that the client device 10 will create the new password, and transmit that to the server 12, for storing by the server 12. The new password that is transmitted to the server 12 can be encrypted using the old password (or a digest of that password) as described above.

Figure 4:
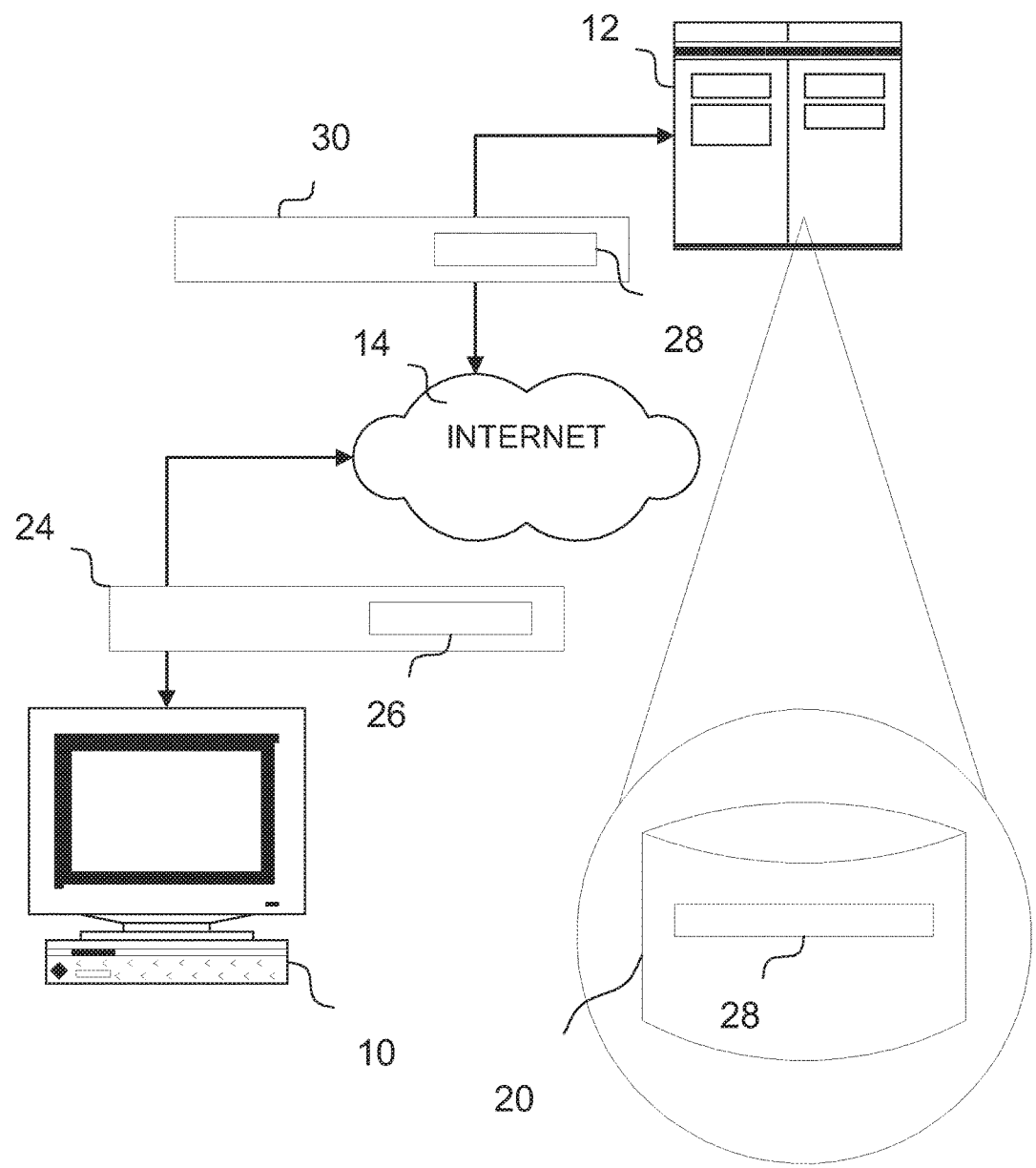
FIG. 4 is a further schematic diagram of the system of FIG. 1.

FIG. 4 shows the system of FIG. 1, showing some of the message traffic in relation to the password handling described above. The server 12 includes a database 20. The client device 10 sends a request 24 to access a service provided by the server 12. The request 24 includes a password 26. Once the server 12 has received the request 24, then the server 12 will access their database 20 to retrieve the expiry date 28 for the received password 26. The server 12 then replies to the client device 10 with the response 30, which includes the header containing the expiry date 28. In this way, the client device 10 is provided with information about the expiry of the password 26, whenever there is an attempt access a service with the specific password 26.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

The invention claimed is:

1. A method of operating a server comprising, with a processor:
   receiving an authorization request comprising a first password;
   accessing an expiry date for the first password;
   transmitting a response comprising password status information comprising the expiry date;
   ascertaining whether the first password has expired; and
   receiving a second password as a replacement password if the first password has expired;
   determining whether the second password is acceptable as the replacement password; and,
   in response to the second password being determined as unacceptable as the replacement password, transmitting a response including an integer value representing a retry parameter, the integer value being unchanged.

2. The method of claim 1, wherein the transmitted response further comprises a date representing the last use of the first password.

3. The method of claim 1, further comprising receiving a request comprising the first password, and transmitting a response including the integer value representing the retry parameter, the integer value being decremented by 1.

4. The method of claim 1, wherein the step of transmitting a response comprising the expiry date comprises transmitting a message including a header, the header comprising the expiry date.

5. The method of claim 4, further comprising operating the server according to a request and reply transfer protocol, wherein the transmitted response is a reply according to the protocol.

6. The method of claim 5, wherein the transmitted response, being a reply according to the protocol, is transmitted by the server every time an authorization request is received.

7. The method of claim 1, wherein the second password is encrypted using the first password.

8. The method of claim 1, further comprising modifying the manner wherein a client device prompts a user for credentials based on the password status information.

9. A computer program product for operating a server, the computer program product comprising:
- a computer readable storage device comprising computer usable program code embodied therewith, the computer usable program code comprising:
- computer usable program code to, when executed by a processor, receive an authorization request comprising an old password;
- computer usable program code to, when executed by a processor, access an expiry date for the old password;
- computer usable program code to, when executed by a processor, transmit a response comprising the expiry date and an integer value representing a retry parameter;
- computer usable program code to, when executed by a processor, ascertain whether the old password has expired;
- computer usable program code to, when executed by a processor, modify a way that a user is prompted for credentials at a client device based on the expiry date by prompting for a replacement of an expired password;
- computer usable program code to, when executed by a processor, receive a new password, when the old password has expired;
- computer usable program code to, when executed by a processor, receive a request comprising the new password;
- computer usable program code to, when executed by a processor, ascertain whether the new password is unacceptable as a replacement password; and
- computer usable program code to, when executed by a processor, transmit a response including the integer value representing the retry parameter, the integer value being unchanged if the new password is unacceptable as the replacement password.

10. The computer program product of claim 9, wherein the transmitted response further comprises a date representing the last use of the old password.

11. The computer program product of claim 9 further comprising:
- computer usable program code to, when executed by a processor, receive a request comprising the old password, and
- computer usable program code to, when executed by a processor, transmit a response including the integer value representing the retry parameter, the integer value being decremented by 1.

12. The computer program product of claim 9, wherein the computer usable program code to, when executed by a processor, transmit a response comprising the expiry date comprises computer usable program code to, when executed by a processor, transmit a message including a header, the header comprising the expiry date.

13. The computer program product of claim 12, further comprising computer usable program code to, when executed by a processor, operate the server according to a request and reply transfer protocol, wherein the transmitted response is a reply according to the protocol.

14. The computer program product of claim 13, wherein the transmitted response, being a reply according to the protocol, is transmitted by the server every time an authorization request is received.

15. A server to, with a hardware processor:
- receive an authorization request comprising a first password,
- access an expiry date for the first password,
- transmit a first response comprising the expiry date to allow a client to modify a way that a user is prompted for credentials,
- determine whether the first password has expired,
- receive a second password as a replacement for the first password if the first password has expired,
- determine whether the second password is acceptable as the replacement for the first password, and,
- in response to the second password being determined to be unacceptable as the replacement for the first password, transmit a second response including an integer value representing a retry parameter, the integer value being unchanged.

16. The server of claim 15, wherein the first transmitted response further comprises a date representing the last use of the first password.

17. The server of claim 15, wherein the server, in response to receiving a request comprising the first password, transmits a third response including the integer value representing the retry parameter, the integer value being decremented by 1.

18. The server of claim 15, wherein the server is operated according to a request and reply transfer protocol, and wherein the transmitted first and second responses is a reply according to the protocol.

* * * * *